United States Patent
Opshaug et al.

(10) Patent No.: US 10,560,942 B2
(45) Date of Patent: Feb. 11, 2020

(54) SUB-BAND UTILIZATION FOR A WIRELESS POSITIONING MEASUREMENT SIGNAL

(71) Applicant: QUALCOMM Incorporated, San Diego, CA (US)

(72) Inventors: Guttorm Ringstad Opshaug, Redwood City, CA (US); Stephen William Edge, Escondido, CA (US); Jie Wu, San Diego, CA (US); Rayman Wai Pon, Cupertino, CA (US); Naga Bhushan, San Diego, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/011,767

(22) Filed: Jun. 19, 2018

(65) Prior Publication Data
US 2019/0261368 A1    Aug. 22, 2019

Related U.S. Application Data

(60) Provisional application No. 62/633,486, filed on Feb. 21, 2018.

(51) Int. Cl.
*H04W 72/04* (2009.01)
*H04W 64/00* (2009.01)
*H04L 5/00* (2006.01)
*H04W 84/04* (2009.01)

(52) U.S. Cl.
CPC ....... *H04W 72/0453* (2013.01); *H04L 5/0041* (2013.01); *H04L 5/0048* (2013.01); *H04W 64/00* (2013.01); *H04L 5/0005* (2013.01); *H04W 84/042* (2013.01)

(58) Field of Classification Search
CPC ............. H04W 72/0453; H04W 64/00; H04W 84/042; H04L 5/0048; H04L 5/0041; H04L 5/0005
See application file for complete search history.

(56) References Cited

U.S. PATENT DOCUMENTS

| | | |
|---|---|---|
| 2015/0263837 A1 | 9/2015 | Patel et al. |
| 2016/0150437 A1* | 5/2016 | Vannithamby et al. ............... H04W 28/0215 370/330 |
| 2017/0238298 A1 | 8/2017 | Wang et al. |
| 2017/0339658 A1 | 11/2017 | Wang et al. |

OTHER PUBLICATIONS

International Search Report and Written Opinion—PCT/US2019/012094—ISA/EPO—Mar. 21, 2019.

* cited by examiner

*Primary Examiner* — Walter J Divito
(74) *Attorney, Agent, or Firm* — Kilpatrick Townsend & Stockton, LLP

(57) ABSTRACT

A reference signal may provide for enhanced bandwidth utilization to enable highly accurate position determination with relatively low bandwidth. For a given allocated bandwidth, a reference signal may use of only a portion of the allocated bandwidth by using plurality of sub-bands. In some cases, the sub-bands may be near the edges of the allocated band to maximize Gabor bandwidth.

38 Claims, 10 Drawing Sheets

SUB-BAND UTILIZATION FOR A WIRELESS POSITIONING MEASUREMENT SIGNAL

RELATED APPLICATIONS

This application claims the benefit of U.S. Provisional Application No. 62/633,486, filed Feb. 21, 2018, entitled "SUB-BAND UTILIZATION FOR A POSITIONING SIGNAL IN 5G", which is assigned to the assignee hereof, and incorporated herein in its entirety by reference.

BACKGROUND

1. Field

The subject matter disclosed herein relates to electronic devices, and more particularly to methods and apparatuses for use to support location of a mobile device using a fifth-generation (5G) wireless network.

2. Information

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. It is expected that standardization for new fifth-generation (5G) wireless networks will include support for various positioning methods, which may utilize reference signals transmitted by base stations in a manner similar to which Long-Term Evolution (LTE) wireless networks currently utilize Positioning Reference Signals (PRS), Cell-specific Reference Signals (CRS), and/or Tracking Reference Signals (TRS) for position determination. However, PRS, CRS, and TRS signals are limited in many regards.

SUMMARY

Embodiments provided herein are directed to a reference signal (also referred to herein a positioning measurement signal) that may be used in 5G, and that overcomes many of these limitations. More specifically, embodiments provide for enhanced bandwidth utilization of reference signals, enabling highly accurate position determination with relatively low bandwidth. For a given allocated bandwidth, embodiments described herein provide for the utilization of only a portion of the allocated bandwidth. In some cases a plurality of sub-bands may be used near the edges of the allocated band to maximize Gabor bandwidth (BW), which can help enable position determination with the same accuracy as if the entire bandwidth were utilized.

An example method of providing reference signals with a base station in a wireless telecommunication network, according to the description, comprises determining one or more symbols of one or more resource blocks during which a first reference signal is to be transmitted on an allocated frequency band, the allocated frequency band being centered at a center frequency and having a minimum frequency and a maximum frequency. The method further comprises transmitting, with the base station and during the determined one or more symbols, the first reference signal on a first portion of the allocated frequency band such that a power of the first reference signal occupies a plurality of non-contiguous sub-bands of the allocated frequency band, the plurality of non-contiguous sub-bands of the allocated frequency band having a total bandwidth of less than a bandwidth of the allocated frequency band.

Embodiments of the method additionally may comprise one or more of the following features. The wireless telecommunication network may comprise a fifth-generation (5G) cellular network. The plurality of non-contiguous sub-bands may comprise a lower sub-band and an upper sub-band having a bandwidth within the allocated frequency band, between the lower sub-band and upper sub-band, and a bandwidth of the lower sub-band is substantially the same as a bandwidth of the upper sub-band. The bandwidth within the allocated frequency band, between the lower sub-band and the upper sub-band, may be larger than a bandwidth of either the lower sub-band or the upper sub-band. The bandwidth within the allocated frequency band, between the lower sub-band and the upper sub-band, may be substantially the same as a combined bandwidth or the lower sub-band and the upper sub-band. The method may further comprise transmitting a second reference signal on a second portion of the allocated frequency band such that the power of the second reference signal occupies one or more sub-bands of the allocated frequency band different than the plurality of non-contiguous sub-bands of the allocated frequency band. The method may further comprise transmitting the first reference signal on the first portion of the allocated frequency band with a first periodicity and transmitting the second reference signal on the second portion of the allocated frequency band with a second periodicity different than the first periodicity. Transmitting the first reference signal may comprise encoding the reference signal with a Zadoff-Chu code. Determining the one or more symbols of the one or more resource blocks during which the first reference signal is to be transmitted on the allocated frequency band further may comprise receiving an indication of the allocated frequency band from a location server. The indication of the allocated frequency band comprises an indication of an offset for each sub-band of the plurality of non-contiguous sub-bands, a bandwidth for each sub-band of the plurality of non-contiguous sub-bands, a periodicity of the first reference signal, a duration of the first reference signal, or any combination thereof.

An example base station, according to the description, comprises a wireless communication interface, a memory, and a processing unit communicatively coupled with the wireless communication interface and the memory. The processing unit is configured to determine one or more symbols of one or more resource blocks during which a first reference signal is to be transmitted on an allocated frequency band, the allocated frequency band being centered at a center frequency and having a minimum frequency and a maximum frequency. The processing unit is further configured to transmit, with the wireless communication interface and during the determined one or more symbols, the first reference signal on a first portion of the allocated frequency band such that a power of the first reference signal occupies a plurality of non-contiguous sub-bands of the allocated frequency band, the plurality of non-contiguous sub-bands of the allocated frequency band having a total bandwidth of less than a bandwidth of the allocated frequency band.

Embodiments of the base station additionally may comprise one or more of the following features. The base station may be configured to be incorporated into a wireless telecommunication network comprising a fifth-generation (5G) cellular network. The plurality of non-contiguous sub-bands may comprise a lower sub-band and an upper sub-band having a bandwidth within the allocated frequency band, between the lower sub-band and upper sub-band, and a bandwidth of the lower sub-band is substantially the same as a bandwidth of the upper sub-band. The bandwidth within the allocated frequency band, between the lower sub-band and the upper sub-band, may be larger than a bandwidth of either the lower sub-band or the upper sub-band. The bandwidth within the allocated frequency band, between the lower sub-band and the upper sub-band, may be substantially the same as a combined bandwidth or the lower sub-band and the upper sub-band. The processing unit may be further configured to transmit a second reference signal on a second portion of the allocated frequency band such that the power of the second reference signal occupies one or more sub-bands of the allocated frequency band different than the plurality of non-contiguous sub-bands of the allocated frequency band. The processing unit may be further configured to transmit the first reference signal on the first portion of the allocated frequency band with a first periodicity and transmitting the second reference signal on the second portion of the allocated frequency band with a second periodicity different than the first periodicity. The processing unit may be configured to transmit the first reference signal at least in part by encoding the first reference signal with a Zadoff-Chu code. The processing unit may be configured to determine the one or more symbols of the one or more resource blocks during which the first reference signal is to be transmitted on the allocated frequency band further at least in part by receiving an indication of the allocated frequency band from a location server. The processing unit may be configured to receive the indication of the allocated frequency band comprising an indication of an offset for each sub-band of the plurality of non-contiguous sub-bands, a bandwidth for each sub-band of the plurality of non-contiguous sub-bands, a periodicity of the first reference signal, a duration of the first reference signal, or any combination thereof.

An example device, according to the description, comprises means for determining one or more symbols of one or more resource blocks during which a first reference signal is to be transmitted on an allocated frequency band, the allocated frequency band being centered at a center frequency and having a minimum frequency and a maximum frequency. The device further comprises means for transmitting, during the determined one or more symbols, the first reference signal on a first portion of the allocated frequency band such that a power of the first reference signal occupies a plurality of non-contiguous sub-bands of the allocated frequency band, the plurality of non-contiguous sub-bands of the allocated frequency band having a total bandwidth of less than a bandwidth of the allocated frequency band.

Embodiments of the device additionally may comprise one or more of the following features. The device may further comprise means for transmitting a second reference signal on a second portion of the allocated frequency band such that the power of the second reference signal occupies one or more sub-bands of the allocated frequency band different than the plurality of non-contiguous sub-bands of the allocated frequency band. The device may further comprise means for transmitting the first reference signal on the first portion of the allocated frequency band with a first periodicity and transmitting the second reference signal on the second portion of the allocated frequency band with a second periodicity different than the first periodicity. The means for transmitting the first reference signal may comprise means for encoding the reference signal with a Zadoff-Chu code.

An example method of detecting a reference signal received from a base station in a wireless telecommunication network, according to the description, comprises determining, with a user equipment (UE), one or more symbols of one or more resource blocks during which the reference signal is to be transmitted via an allocated frequency band, the allocated frequency band being centered at a center frequency and having a minimum frequency and a maximum frequency. The method further comprises receiving, with the UE and during the determined one or more symbols, the reference signal on a portion of the allocated frequency band, wherein a power of the reference signal occupies a plurality of non-contiguous sub-bands of the allocated frequency band, the plurality of non-contiguous sub-bands of the allocated frequency band having a total bandwidth of less than the bandwidth of the allocated frequency band. The method also comprises processing the reference signal with the UE.

Embodiments of the method additionally may comprise one or more of the following features. Processing the reference signal may comprise performing a cross-correlation of the signal with a pre-determined code. The method may further comprise determining a time at which the reference signal was received by the UE based on the processing of the reference signal. Determining the one or more symbols of the one or more resource blocks during which the reference signal is to be transmitted further may comprise receiving an indication of the allocated frequency band from a location server. The indication of the allocated frequency band may comprise an indication of an offset for each sub-band of the plurality of non-contiguous sub-bands, a bandwidth for each sub-band of the plurality of non-contiguous sub-bands, a periodicity of the reference signal, a duration of the reference signal, or any combination thereof.

An example user equipment (UE), according to the description, comprises a wireless communication interface, a memory, and a processing unit communicatively coupled with the wireless communication interface and the memory. The processing unit is configured to determine one or more symbols of one or more resource blocks during which a reference signal is to be transmitted by a base station in a wireless telecommunication network, via an allocated frequency band, the allocated frequency band being centered at a center frequency and having a minimum frequency and a maximum frequency. The processing unit is further configured to receive, during the determined one or more symbols, the reference signal on a portion of the allocated frequency band, wherein a power of the reference signal occupies a plurality of non-contiguous sub-bands of the allocated frequency band, the plurality of non-contiguous sub-bands of the allocated frequency band having a total bandwidth of less than the bandwidth of the allocated frequency band. The The processing unit is also configured to process the reference signal.

Embodiments of the processing unit additionally may comprise one or more of the following features. The processing unit may be configured to process the reference signal at least in part by performing a cross-correlation of the signal with a pre-determined code. The processing unit may be configured to determine a time at which the reference signal was received by the UE based on the processing of the reference signal. The processing unit may be configured to determine the one or more symbols of the one or more resource blocks during which the reference signal is to be transmitted further at least in part by receiving an indication of the allocated frequency band from a location server. The processing unit may be configured to receive the indication of the allocated frequency band comprising an indication of an offset for each sub-band of the plurality of non-contiguous sub-bands, a bandwidth for each sub-band of the plurality of non-contiguous sub-bands, a periodicity of the reference signal, a duration of the reference signal, or any combination thereof.

An example device, according to the description, comprises means for one or more symbols of one or more resource blocks during which a reference signal is to be transmitted by a base station in a wireless telecommunication network, via an allocated frequency band, the allocated frequency band being centered at a center frequency and having a minimum frequency and a maximum frequency. The devise additionally comprises means for receiving, during the determined one or more symbols, the reference signal on a portion of the allocated frequency band, wherein a power of the reference signal occupies a plurality of non-contiguous sub-bands of the allocated frequency band, the plurality of non-contiguous sub-bands of the allocated frequency band having a total bandwidth of less than the bandwidth of the allocated frequency band. The device also comprises means for processing the reference signal.

Embodiments of the device additionally may comprise one or more of the following features. The means for processing the reference signal may comprise means for performing a cross-correlation of the signal with a pre-determined code. The device may further comprise means for determining a time at which the reference signal was received by the device based on the processing of the reference signal. The device may further comprise means for determining the one or more symbols of the one or more resource blocks during which the reference signal is to be transmitted further comprises receiving an indication of the allocated frequency band from a location server.

BRIEF DESCRIPTION OF DRAWINGS

Non-limiting and non-exhaustive aspects are described with reference to the following figures.

Figure 1:
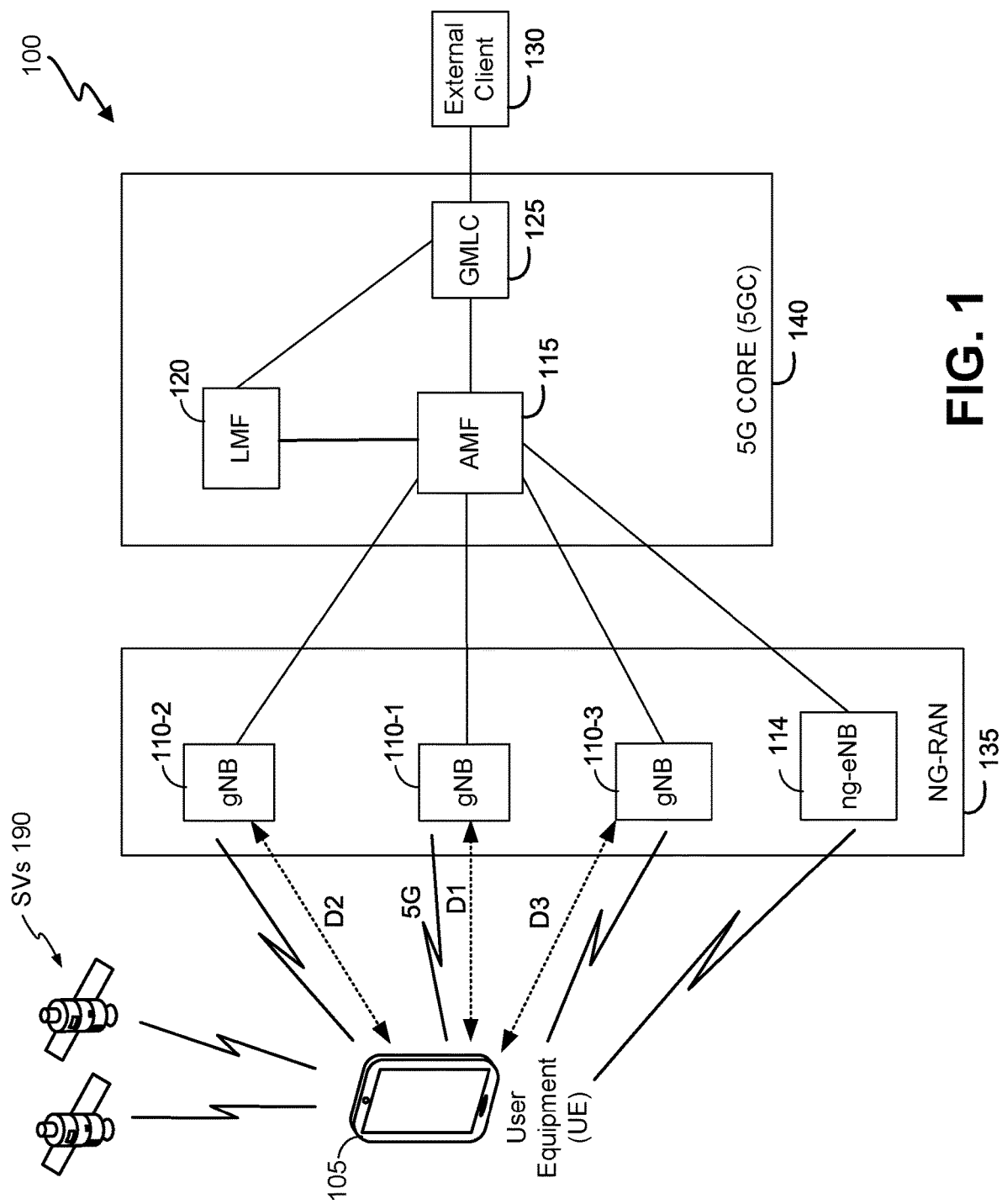
FIG. 1 is a diagram of a communication system that may utilize a 5G network to determine a position for a user equipment (UE), according to an embodiment.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g. elements 110 in the previous example would refer to elements 110-1, 110-2 and 110-3).

DETAILED DESCRIPTION

Some example techniques for determining the location of a user equipment (UE) are presented herein, which may be implemented at the UE (e.g., a mobile device or mobile station), a location server (LS), a base station, and/or other devices. These techniques can be utilized in a variety of applications utilizing various technologies and/or standards, including 3rd Generation Partnership Project (3GPP), Open Mobile Alliance (OMA), 3GPP Long Term Evolution (LTE) Positioning Protocol (LPP) and/or OMA LPP Extensions (LPPe), WiFi®, Global Navigation Satellite System (GNSS), and the like.

A UE may comprise a mobile device such as, a mobile phone, smartphone, tablet or other mobile computer, a portable gaming device, a personal media player, a personal navigation device, a wearable device, an in-vehicle device, or other electronic device. Position determination of a UE can be useful to the UE and/or other entities in a wide variety of scenarios. There are many methods already known to determine an estimated position of the UE, including methods that involve communicating measurement and/or other information between the UE and an LS.

It is expected that fifth-generation (5G) standardization will include support for positioning methods based on Observed Time Difference Of Arrival (OTDOA) and round-trip time (RTT). With OTDOA, a UE measures time differences, referred to as Reference Signal Time Differences (RSTDs), between reference signals transmitted by one or more pairs of base stations. In previous LTE networks, reference signals would comprise signals that are intended only for positioning (e.g., PRS) or may be signals intended also for serving cell timing and frequency acquisition, such as CRS or TRS. If a UE is able to measure three or more RSTDs between three or more corresponding different pairs of base stations (typically comprising a common reference base station in each pair and different neighbor base stations), the horizontal UE location can be obtained if the antenna locations and the relative timing of the base stations are known. Typically, knowing the relative timing of the base stations requires synchronizing the timing of each base station to a common absolute time using a Global Positioning System (GPS) or Global Navigation Satellite System (GNSS) receiver or using other means (e.g., GNSS receivers) to determine the association of base station timing to some absolute time.

Even with synchronization, PRS, CRS, and TRS signals can often collide with other signals in the LTE network, and therefore are frequently dropped. Moreover, the signals often use a bandwidth larger than is necessary for position determination.

Embodiments described herein are directed to providing a new positioning measurement signal (referred to herein more generically as a new "reference signal") in 5G that enables the dynamic utilization of sub-bands.

FIG. 1 is a diagram of a communication system 100 that may utilize a 5G network to determine a position a UE 105 using OTDOA-based positioning methods, according to an embodiment. Here, the communication system 100 comprises a UE 105 and a 5G network comprising a Next Generation (NG) Radio Access Network (RAN) (NG-RAN) 135 and a 5G Core Network (5GC) 140, which, along with providing OTDOA-based positioning, may provide data and voice communication to the UE 105. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from GNSS satellite vehicles (SVs) 190. Additional components of the communication system 100 are described below. It will be understood that a communication system 100 may include additional or alternative components.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, Access and Mobility Management Functions (AMFs) 115, external clients 130, and/or other components. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, as noted above, UE 105 may correspond to any of a variety of devices, including a cellphone, smartphone, laptop, tablet, PDA, tracking device, navigation device, Internet of Things (IoT) device, wearable device, embedded modem, automotive or other vehicular computing device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), Long Term Evolution (LTE), High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may enable the UE 105 to communicate with an external client 130 (e.g. via elements of 5GC 140 not shown in FIG. 1 or possibly via Gateway Mobile Location Center (GMLC) 125) and/or enable the external client 130 to receive location information regarding the UE 105 (e.g. via GMLC 125).

The UE 105 may comprise a single entity or may comprise multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise.

Base stations in the NG-RAN 135 may comprise NR Node Bs which are more typically referred to as gNBs. In FIG. 1, three gNBs are shown—gNBs 110-1, 90-2 and 90-3, which are collectively and generically referred to herein as gNBs 110. However, a typical NG RAN 135 could comprise dozens, hundreds, or even thousands of gNBs 110. Pairs of gNBs 110 in NG-RAN 135 may be connected to one another (not shown in FIG. 1). Access to the 5G network is provided to UE 105 via wireless communication between the UE 105 and one or more of the gNBs 110, which may provide wireless communications access to the 5GC 140 on behalf of the UE 105 using 5G (also referred as NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughput and bandwidth to UE 105.

Base stations (BSs) in the NG-RAN 135 shown in FIG. 1 may also or instead include a next generation evolved Node B, also referred to as an ng-eNB 114. Ng-eNB 114 may be connected to one or more gNBs 110 in NG-RAN 135 (not shown in FIG. 1)—e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons which may transmit signals (e.g., positioning measurements signals as described herein) and/or may broadcast assistance data to assist positioning of UE 105 but may not receive signals from UE 105 or from other UEs. It is noted that while only one ng-eNB 114 is shown in FIG. 1, the description below sometimes assumes the presence of multiple ng-eNBs 114.

As noted, while FIG. 1 depicts nodes configured to communicate according to 5G communication protocols, nodes configured to communicate according to other communication protocols, such as, for example, an LPP protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The position measurement signals described herein for support of UE 105 positioning may be applicable to such other networks.

The gNBs 110 and ng-eNB 114 can communicate with an AMF 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE 105 accesses the NG-RAN 135 and may support position methods such as Observed Time Difference of Arrival (OTDOA) (which can utilize the positioning measurement signals described herein) and others. The LMF 120 may also process location services requests for the UE 105, e.g., received from the AMF 115 or from the GMLC 125. The LMF 120 may be connected to AMF 115 and/or to GMLC 125. It is noted that in some embodiments, at least part of the positioning functionality (including derivation of a UE 105's location) may be performed at the UE 105 (e.g., using signal measurements obtained by UE 105 for position measurement signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115 and the GMLC 125 may then return the location response (e.g., containing the location estimate) to the external client 130. The GMLC 125 is shown connected to both the AMF 115 and LMF 120 in FIG. 1 though only one of these connections may be supported by 5GC 140 in some implementations.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown FIG. 1) in the 5GC 150. For example, the WLAN may support IEEE 802.11 WiFi access for UE 105 and may comprise one or more WiFi APs. Here, the N3IWF may connect to the WLAN and to other elements in the 5GC 150 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an Evolved Serving Mobile Location Center (E-SMLC) in place of the LMF 120 and a GMLC that may be similar to the GMLC 125. In such an EPS, the E-SMLC may send and receive location information to and from the eNBs in the E-UTRAN and may support positioning of UE 105. In these other embodiments, positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

Position determination of the UE 105 by the communication system 100 typically involves determining a distance between the UE 105 and each of a plurality of base stations 110, 114 (e.g., distances D1, D2, and D3 between the UE 105 and GNBs 110-1, 90-2, and 90-3, respectively), and using trilateration to determine the UE's location. As noted above, to determine these distances, the UE 105 can measure position measurement signals (including the reference signals discussed herein below) transmitted by these base stations 110, 114. Position determination using OTDOA based on RSTD measurements, for example, typically requires either synchronization of the transmission of these reference signals by the base stations 110, 114 or knowledge obtained in some other way of the RTDs between pairs of base stations 110, 114. The LMF 120 typically has this knowledge, and thus, position determination in asynchronous networks based on measurements taken by the UE 105 of the various base stations 110, 114 can involve, for example, the LMF 120 determining the position of the UE 105 after receiving the measurements from the UE 105, or the UE 105 determining its own position after receiving RTD information from the LMF 120. In LTE networks, PRS reference signals are typically used to make these RSTD measurements for OTDOA positioning.

Figure 2:
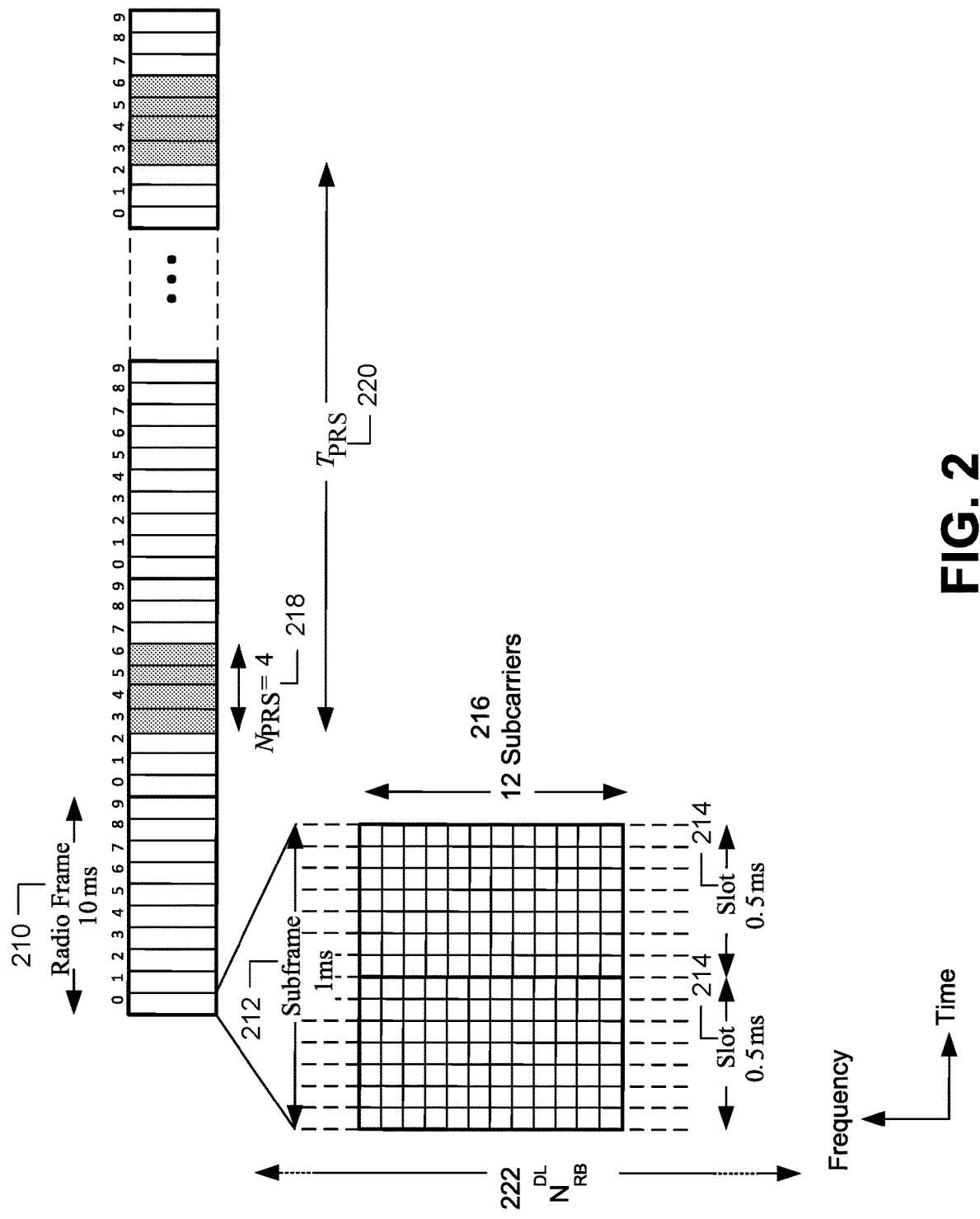
FIG. 2 is an illustration of the structure of an LTE subframe sequence with PRS positioning occasions, provided for reference.

FIG. 2 is an illustration of the structure of an LTE subframe sequence with PRS positioning occasions, provided for reference. In FIG. 2, time is represented horizontally (e.g., on an X axis) with time increasing from left to right, while frequency is represented vertically (e.g., on a Y axis) with frequency increasing (or decreasing) from bottom to top, as illustrated. As shown in FIG. 2, downlink and uplink LTE Radio Frames 210 are of 10 ms duration each. For downlink Frequency Division Duplex (FDD) mode, Radio Frames 210 are organized into ten subframes 212 of 1 ms duration each. Each subframe 212 comprises two slots 214, each of 0.5 ms duration. In LTE, these radio frames 210 are transmitted by base stations similar to base stations 110, 114 of FIG. 1. PRS may be detected by any UE in the area and are therefore considered to be "broadcast" by these base stations.

In the frequency domain, the available bandwidth may be divided into uniformly spaced orthogonal subcarriers 216. For example, for a normal length cyclic prefix using 15 kHz spacing, subcarriers 216 may be grouped into a group of 12 subcarriers or "frequency bins." Each grouping, which comprises 12 subcarriers 216, in FIG. 2, is termed a "resource block" (or "physical resource block" (PRB)) and, in the example above, the number of subcarriers in the resource block may be written as $N_{SC}^{RB}=12$. For a given channel bandwidth, the number of available resource blocks on each channel 222, which is also called the transmission bandwidth configuration 222, is indicated as $N_{DL}^{RB}$ 222. For example, for a 3 MHz channel bandwidth in the above example, the number of available resource blocks on each channel 222 is given by $N_{RB}^{DL}=15$.

Resource blocks therefore can be described as a unit of frequency and time resources in radio frame 210, comprising one subframe 212 (two slots 214) and 12 subcarriers. Each slot 214 comprises 6 or 7 periods, or "symbols," during which a base station (for downlink (DL) radio frames) or UE (for uplink (UL) radio frames) may transmit RF signals. Each 1 subcarrier×1 symbol cell in the 12×12 or 14×12 grid represents a "resource element" (RE), which is the smallest discrete part of the frame and contains a single complex value representing data from a physical channel or signal.

A PRS may be transmitted in special positioning subframes that are grouped into positioning "occasions." For example, in LTE, a PRS positioning occasion can comprise a number $N_{PRS}$ of consecutive positioning subframes 218 where the number $N_{PRS}$ may be between 1 and 160 (e.g. may include the values 1, 2, 4 and 6 as well as other values). The PRS positioning occasions for a cell supported by a base station may occur periodically at intervals 220, denoted by a number $T_{PRS}$, of millisecond (or subframe) intervals where $T_{PRS}$ may equal 5, 10, 20, 40, 80, 160, 320, 640, or 1280. As an example, FIG. 2 illustrates a periodicity of positioning occasions where $N_{PRS}$ equals 4 and $T_{PRS}$ is greater than or equal to 20. In some embodiments, $T_{PRS}$ may be measured in terms of the number of subframes between the start of consecutive positioning occasions.

PRS signals can be deployed with a pre-defined bandwidth, which may be provided, from a location server via a serving base station, to a UE along with other PRS configuration parameters (e.g., $N_{PRS}$, $T_{PRS}$, any muting and/or frequency hopping sequences, PRS ID) and position determine information. Generally speaking, the higher the allocated bandwidth for PRS, the more accurate the position determination, so there is a tradeoff between performance and overhead.

For the 5G standard, it is anticipated that radio frames will be similar to the structure for LTE illustrated in FIG. 2, however, certain characteristics (e.g., timing, available bandwidth, etc.) may vary. Additionally, the characteristics of a new position measurement signal to replace PRS may vary as well, to enable this new reference signal to provide accurate measurements, be robust to multipath, provide a high level of orthogonality and isolation among cells, and consume relatively low UE power, above and beyond the current characteristics of PRS.

Embodiments provided herein provide for enhanced bandwidth utilization of reference signals, enabling highly accurate position determination with relatively low bandwidth. In particular, for a given allocated bandwidth, embodiments described herein provide for the utilization of only a portion of the allocated bandwidth. In some cases, a plurality of sub-bands may be used near the edges of the allocated band to maximize Gabor bandwidth (BW), enabling for position determination with the same accuracy as if the entire bandwidth were utilized.

Figure 3A:
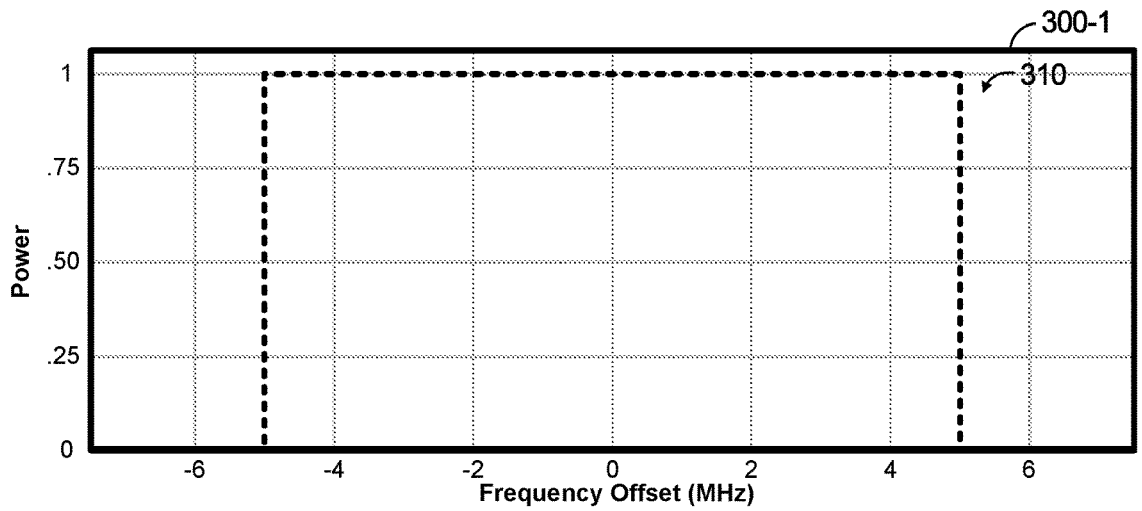
FIGS. 3A-3C are illustrations of a series of graphs that plot power over frequency offset for a reference signal, illustrating the concept of using sub-bands for reference signal transmission.
Figure 3B:
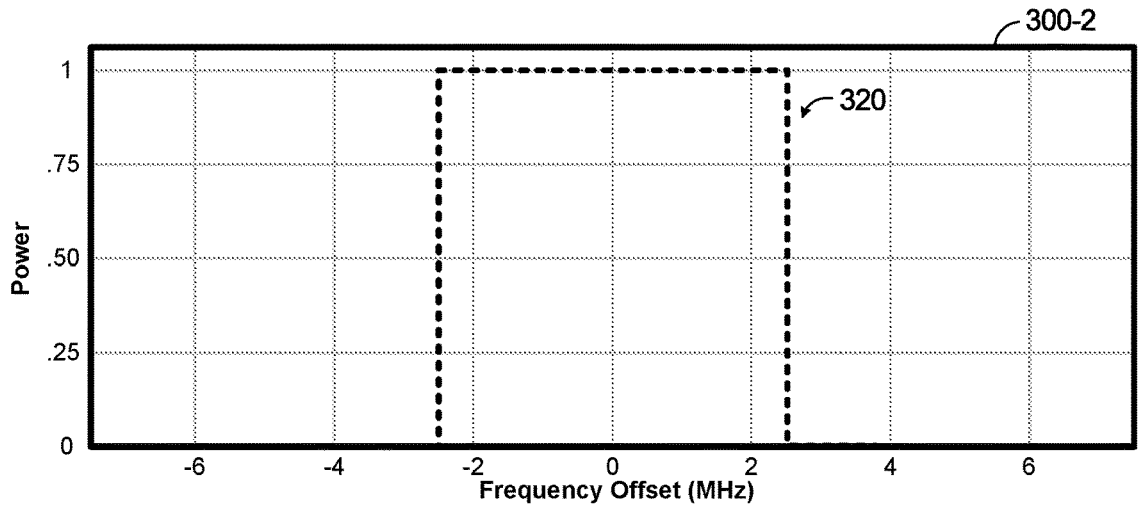
Figure 3C:
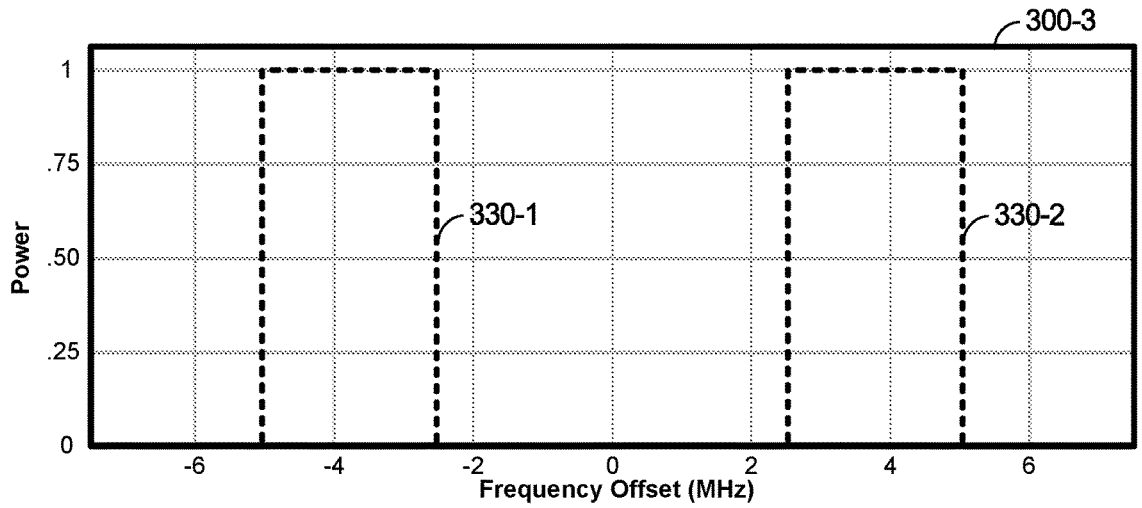

FIGS. 3A-3C a series of graphs 300-1, 300-2, and 300-3 (collectively and generically referred to herein as graphs 300) that plot power over frequency offset for a reference signal, illustrating the concept of using sub-bands for reference signal transmission. As with other figures provided herein, FIGS. 3A-3C are provided as a non-limiting example. The bandwidth and utilization of sub-bands can vary, depending on desired functionality and/or other factors. The width and location of sub-bands used may correspond to the usage of subcarriers as described in FIG. 2. For example, non-contiguous sub-bands may each contain five sub-carriers where each sub-band is spaced one sub-carrier width apart. (Additional details regarding the relationship of subcarriers and sub-bands are provided below and illustrated in FIG. 5.) In relation to resource blocks (as shown in FIG. 2, for example), a reference signal may ultimately be made up from a number of symbols from a number of resource blocks. That collection of resource blocks would have the power profile in the frequency domain as shown in FIGS. 3A-3C.

The first graph 300-1 illustrates a first plot 310 in which power of the total reference signal is distributed evenly across an allocated bandwidth of 10 MHz (±5 MHz, centered at a center frequency). Traditional techniques of transmitting PRS signals may utilize such a power distribution across the full bandwidth. Here, the entire bandwidth is utilized, rather than any sub-bands.

The second graph 300-2 illustrates a second example plot 320 in which the power of the total reference signal is distributed evenly across only a portion of the allocated bandwidth of 10 MHz. Here, a continuous 5 MHz sub-band is used (±2.5 MHz), centered at the center frequency of the allocated bandwidth.

The third graph 300-3 illustrates a third example plot 330-1 and 330-2 (collectively and generically referred to herein as plot 330). In this example, the reference signal is divided into two non-contiguous sub-bands having substantially the same bandwidth: a lower sub-band 330-1 and a upper sub-band 330-2. Embodiments may utilize non-contiguous sub-bands such as those illustrated in the third graph 300-3, to help "spread out" the frequency spectrum utilized. This can help ensure sharper features of autocorrelation peaks by increasing Gabor bandwidth, which can be desirable for Doppler estimation. This phenomenon is illustrated in FIGS. 4A-4C.

Figure 4A:
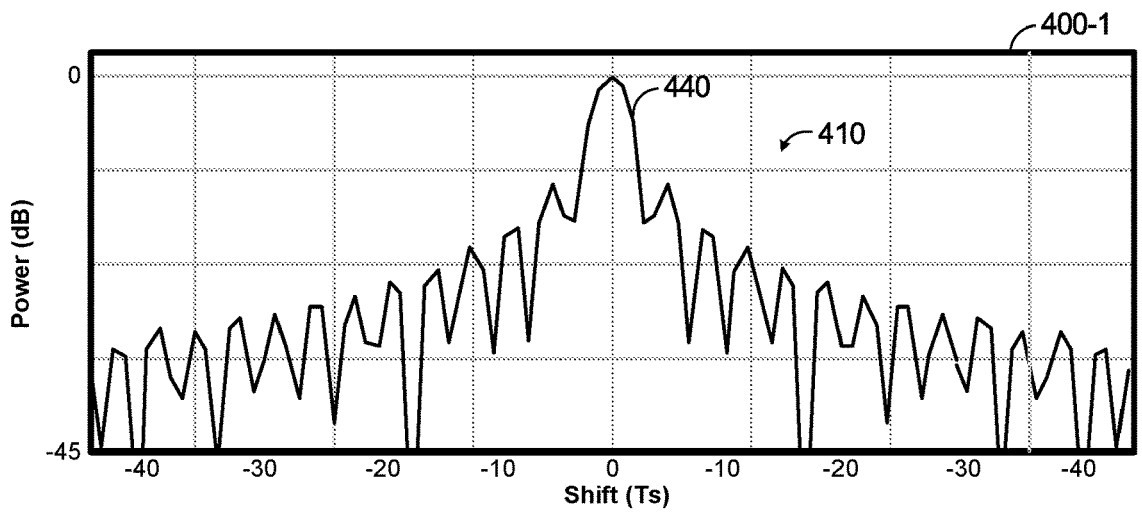
FIGS. 4A-4C are illustrations of a series of graphs, illustrating autocorrelation of example signals transmitted according to the graphs shown in FIGS. 3A-3C.
Figure 4B:
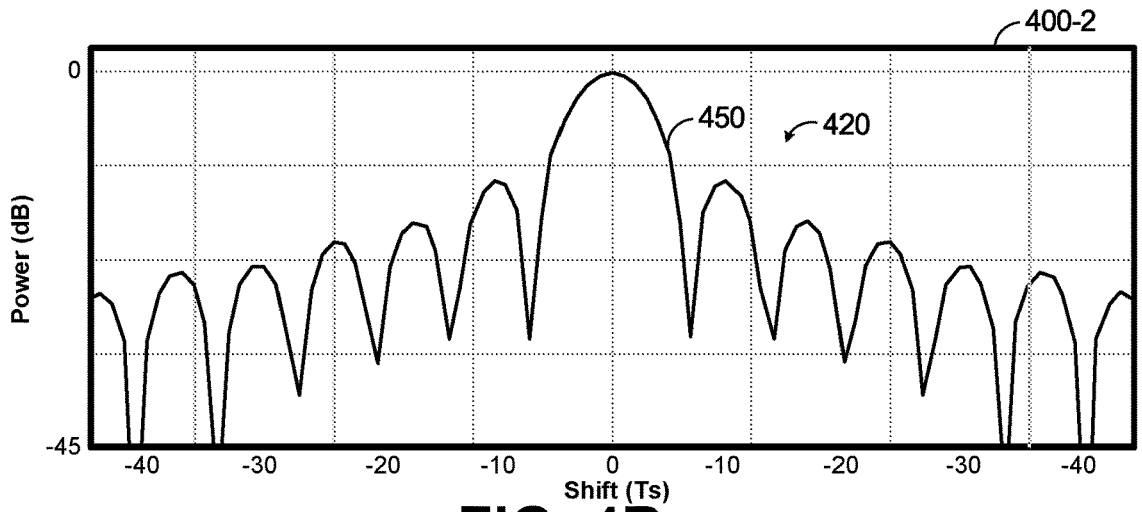
Figure 4C:
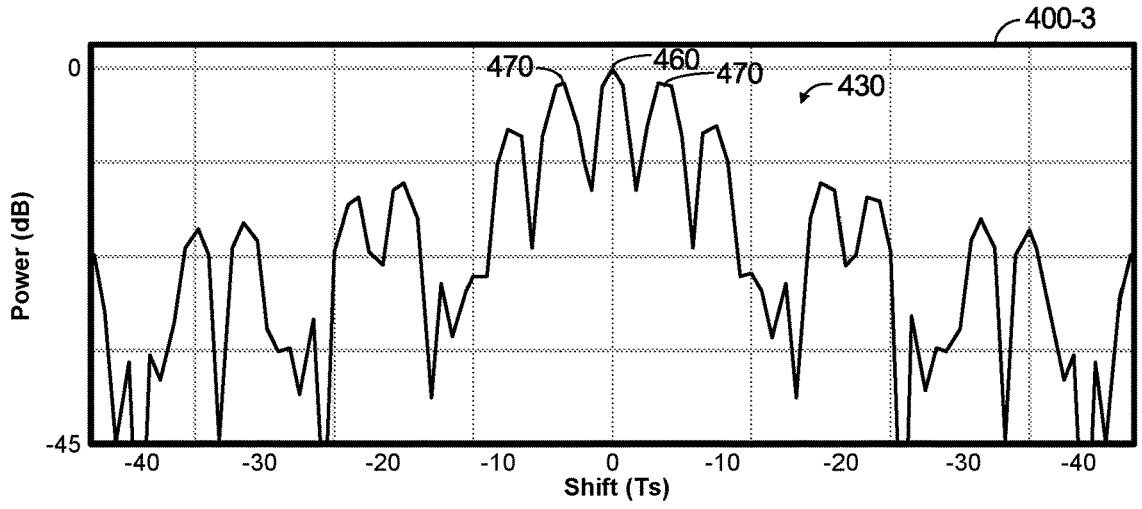

FIGS. 4A-4C are a series of graphs 400-1, 400-2, and 400-3 (collectively and generically referred to herein as graphs 400), illustrating autocorrelation of example signals transmitted in graphs 300-1, 300-2, and 300-3, respectively. As can be seen, the plot 410 of autocorrelation corresponding to the utilization of the full 10 MHz bandwidth in graph 300-1 results in a plot 410, with an easily identifiable center peak 440. The autocorrelation corresponding to the utilization of only 5 MHz in a contiguous block centered at the center frequency results in a plot 420, on the other hand, results in features that are far less sharp. Here, the center peak 450 is much wider than the center peak 440 of plot 410, and thus the Doppler estimation resulting from the reference signal using the 5 MHz contiguous block illustrated in graph 300-2 may be poorer than the Doppler estimation resulting from the reference signal using the 10 MHz contiguous block illustrated in graph 300-1.

But the mere utilization of half the bandwidth does not necessarily result in duller features and poorer resulting Doppler estimation. As can be seen in graph 400-3, the utilization of upper and lower sub-bands 330, as illustrated in graph 300-3 results in a relatively sharp center peak 460 that can enable position determination as accurate as if the full 10 MHz band were utilized. (With the drawback that side lobes 470 are relatively high and would therefore need to be distinguished efficiently.) In other words, because upper and lower sub-bands 330 illustrated in graph 300-3 span 10 MHz, they maximize Gabor bandwidth, providing correlation peaks in graph 400-3 as sharp as those of graph 400-1.

The utilization of upper and lower sub-bands 330, as illustrated in graph 300-3 not only increases Gabor bandwidth (increasing the effective bandwidth use by using sub-bands at the upper- and lower-most portions of the available bandwidth, while reducing the total amount of bandwidth used), it also enables the co-existence of the reference signal with other signals that may utilize the center portion of the bandwidth. For example, other signals (e.g., Primary Synchronization Signal (PSS), Secondary Synchronization Signal (SSS), Physical Broadcast Channel (PBCH), and/or other signals) may utilize a 5 MHz spectrum centered in the channel (similar to the spectrum illustrated in graph 300-2), while the outer portions of the channel are utilized to transmit the new reference signal using upper and lower sub-bands 330 as illustrated in graph 300-3, reducing collisions between the reference signal and these other signals.

That said, any of a variety of sub-bands may be utilized, according to embodiments. According to some embodiments, for example, either an upper sub-band 330-2 may be used, or a lower sub-band 330-1 may be used. And in either case, the total bandwidth of the sub-band may be greater or smaller than the bandwidth of either sub-band 330 illustrated in graph 300-3. In some embodiments, multiple sub-bands may be utilized where different sub-bands have different bandwidths. Additionally or alternatively more than two sub-bands may be used (e.g., 3, 4, 5, etc.), and/or sub-bands may not be located symmetrically from the center frequency. Even so, some reference signals may utilize only a single sub-band. A single embodiment, may implement a plurality of different reference signals. An illustration of this is provided in FIG. 5.

Figure 5:
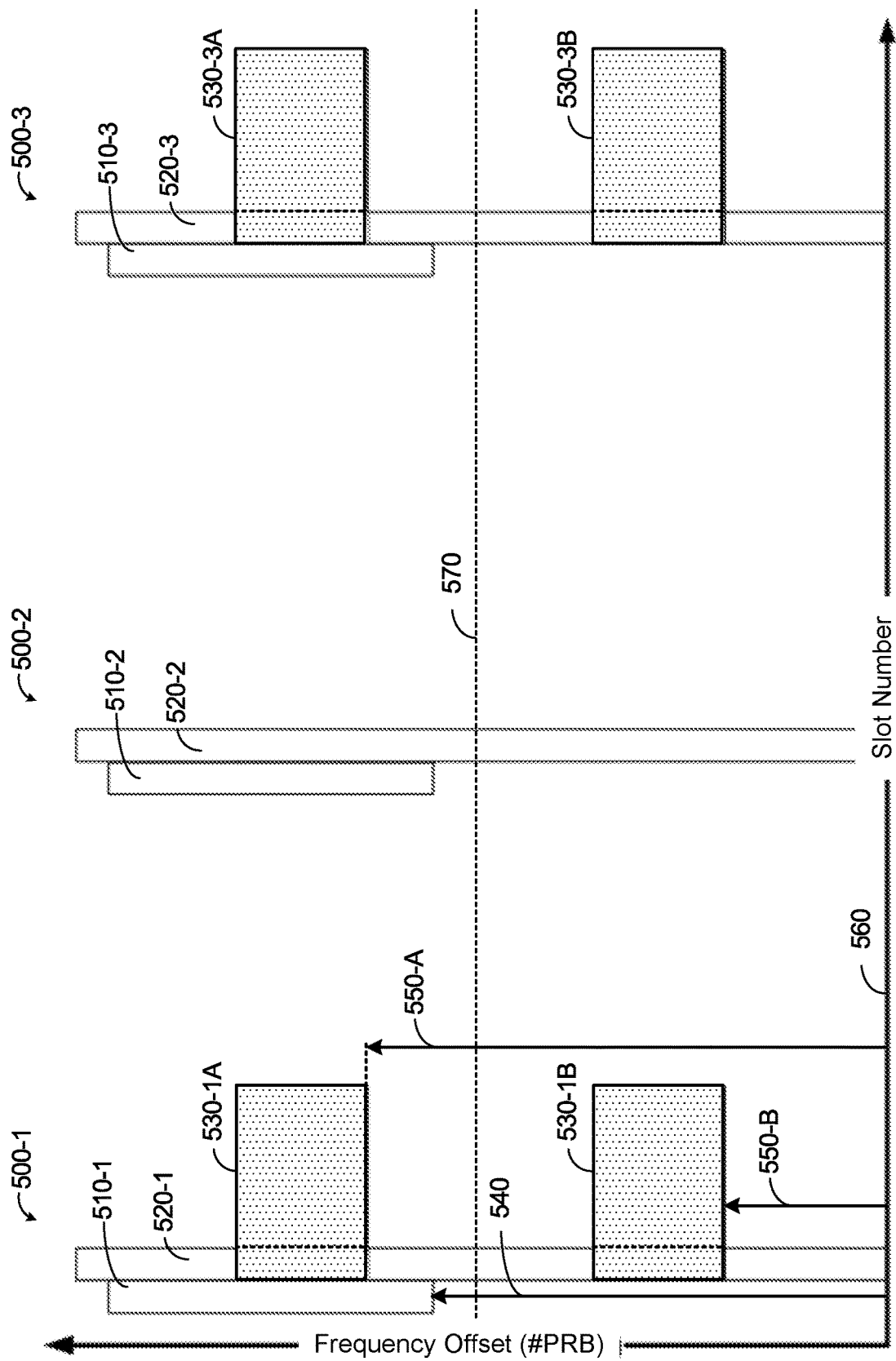
FIG. 5 is an illustration of the frequency offset and symbol use of three different periodically-transmitted reference signals, according to one embodiment.

FIG. 5 is an illustration of the frequency offset (from a reference frequency) and symbol use of three different periodically-transmitted reference signals (e.g. position measurement signals under the 5G standard), according to one embodiment. Here, the different reference signals are represented by different boxes. A first reference signal 510-1, 510-2, and 510-3 (collectively and generically referred to herein as first reference signal 510); a second reference signal 520-1, 520-2, and 520-3 (collectively and generically referred to herein as second reference signal 520); and a third reference signal 530-1A, 530-1B, 530-3A, and 530-3B (collectively and generically referred to herein as third reference signal 530). Here, each reference signal may be transmitted by a different base station. However, in some embodiments, a single base station may transmit one or more reference signals.

As can be seen, the frequency offset and symbols used for each of the reference signals is different. At the first occasion 500-1, for example, the first reference signal 510-1 may use a number of contiguous PRBs at a first slot, the PRBs having an offset (illustrated by arrow 540) from a reference PRB. At a following slot, the second reference signal 520-1, which has no offset and uses the entire block of allocated PRBs, is transmitted. As illustrated, a portion of the PRBs used by the second reference signal 520 are also used by a third reference signal 530 during the same slot (in which case different reference signals may occupy different resource elements of the same slot). The third reference signal 530 is separated into two contiguous blocks of PRBs (labeled 530-1A and 530-1B), and (unlike first reference signal 510 and second reference signal 520) is transmitted over several successive slots (e.g., has a larger value for the 5G equivalent of the $N_{PRS}$ value in LTE, as explained above). Also, the third reference signal 530, having a longer periodicity than the first reference signal 510 and the second reference signal 520 (e.g., having a larger value for the 5G equivalent of the $T_{PRS}$ value in LTE, as explained above), does not appear in the second occasion 500-2.

Similar to LTE, the location server (e.g., LMF 120 of FIG. 1) may communicate values for the various characteristics of the reference signal. As such, the location server may communicate values that define the number of slots, periodicity, and the like. Unlike LTE, however, the location server may further communicate an offset (e.g. offset 540) and/or bandwidth associated with a given reference signal, to communicate the resorts blocks used in each reference signal.

Depending on desired functionality, the offset can be communicated in any of a variety of ways. For example, the offset may be communicated as a frequency or number of PRBs from a reference frequency or PRB. In the example illustrated in FIG. 5, offsets 540, 550-A, and 550-B originate from a frequency 560 at the edge of the allocated block of PRBs. (In alternative embodiments, however, offsets may be communicated as an offset from a center frequency 570 or PRB.) In this example, the first reference signal 510 has an offset 540 (from frequency 560) of 154 PRBs, the second reference signal 520 has an offset of zero, and sub-bands 530-1A and 530-1B of the third reference signal 530 have offsets of 176 and 55, respectively.

Similar to the offset, the bandwidth can also be communicated in any of a variety of ways, depending on desired functionality. For example, the bandwidth may be communicated as a frequency or number of contiguous PRBs, starting from the offset. For example, the first reference signal 510 in FIG. 5 has a bandwidth of 90 PRBs, the second reference signal 520 has an bandwidth of 275 PRBs, and sub-bands 530-1A and 530-1B of the third reference signal 530 each have bandwidths of 44 PRBs.

According to embodiments, the transmission of reference signals can take advantage of any or all of three dimensions of orthogonality used in LTE: time, frequency, and code space. Reference signals can be orthogonal in time and space through the shared use of resource blocks as illustrated in FIGS. 2-5. Reference signals may also be transmitted with a code to help enable identification of the transmission source. For example, different base stations may transmit reference signals with different codes, to enable a receiving UE used to determine which base station transmitted which reference signal.

In LTE, PRS signals utilize Gold code to provide some level of isolation between base stations. Reference signals for 5G, such as those described in the embodiments herein, may also employ Gold code for such isolation. However, embodiments may additionally or alternatively employ other code types. An example of this is Zadoff-Chu code.

The use of Zadoff-Chu code may have some benefits over Gold codes. For instance, Zadoff-Chu codes have perfect autocorrelation properties. For cell (base station) differentiation, Zadoff-Chu codes also have a flat cross-correlation profile. Additionally, Zadoff-Chu code generation can be done by equation rather than shift register, which can mean less computational complexity than alternatives. Further, the use of Zadoff-Chu codes can create a constant amplitude envelope, resulting in low Peak-to-Average Power Ratio (PAPR), a generally desirable feature for power amplifiers and a powerful way to reject false alarms. As such, Zadoff-Chu codes have very desirable properties for use in reference signals.

Because Zadoff-Chu codes need to be prime numbers, they can be truncated or zero padded when used in reference signals because there is an even number of frequency elements. For example, for 3300 frequency bins, Zadoff-Chu codes with the length of 3299 may be used with a zero padding of one to extend to 3300, or a length of 3301 can be truncated to 3300. Either case may still provide desirable auto- and cross-correlation properties for providing orthogonality in a code space.

Figure 6:
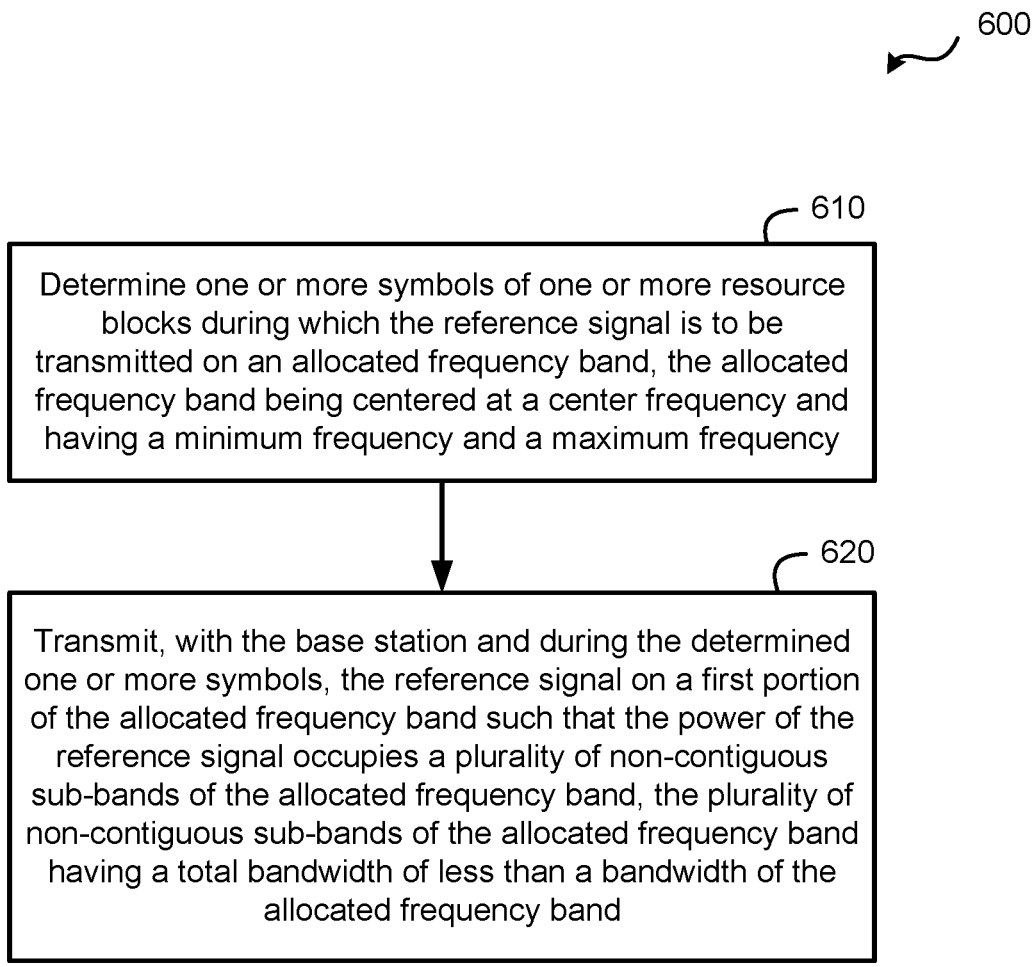
FIG. 6 is a flow diagram illustrating a method of providing reference signals with a base station in a wireless telecommunication network, according to an embodiment.
Figure 10:
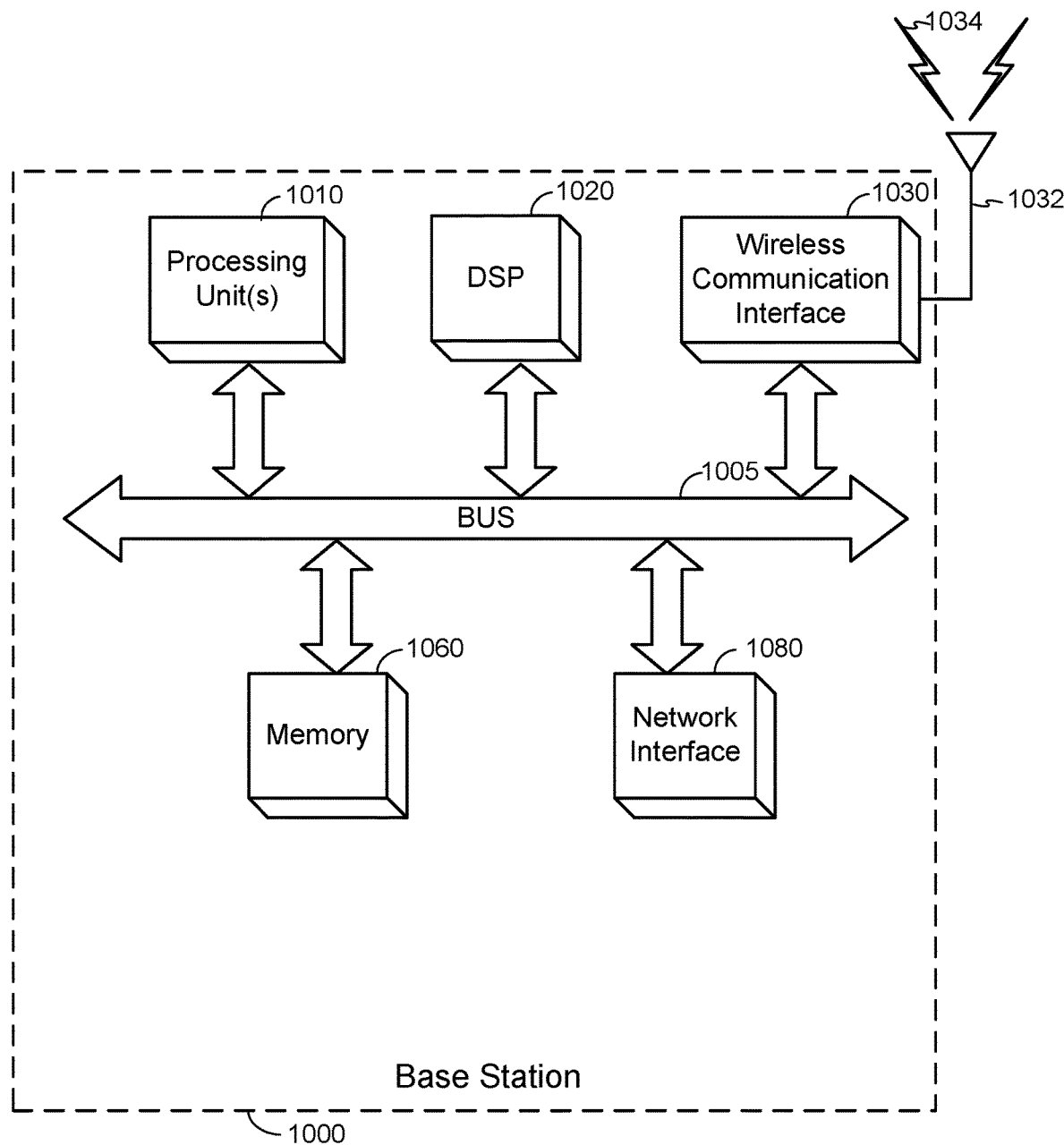
FIG. 10 is an embodiment of a base station.

FIG. 6 is a flow diagram illustrating a method 600 of providing reference signals with a base station in a wireless telecommunication network, according to an embodiment, which illustrates the functionality of a base station according to aspects of embodiments described above and illustrated in FIGS. 1 and 3-5. According to some embodiments, the functionality of one or more blocks illustrated in FIG. 6 may be performed by a base station (e.g., a gNB 110 and or ng-eNB 114, as illustrated in FIG. 1). Means for performing these functions may include software and/or hardware components of a base station as illustrated in FIG. 10 and described in more detail below.

At block 610, the functionality includes determining one or more symbols of one or more resource blocks during which the reference signal is to be transmitted on an allocated frequency band being centered at the center frequency and having a minimum frequency and a maximum frequency. This determination may further comprise determining PRBs and individual resource elements used for the transmission of the reference signal, which may define sub-bands of the allocated frequency band. In FIG. 3C, the example illustrated in graph 300-3, for instance, has an allocated frequency band, with a minimum frequency at an offset of −5 MHz from the center frequency and a maximum frequency at an offset of 5 MHz from the center frequency. The properties of the allocated frequency band (e.g., the allocated frequencies, an offset for each sub-band, a bandwidth for each sub-band, the periodicity of the reference signal, a duration of the reference signal, etc.) may be determined by a location server, which may communicate this information to the base station and/or UE. Depending on desired functionality, the reference signal may be transmitted using one or more symbols of the one or more resource blocks. In addition to other considerations, power considerations of a receiving UE may be taken into account when determining how many symbols to use for transmittal of the reference signal. Using a single symbol per slot (rather than multiple symbols), for example, can reduce power consumption for the UE. As noted above, the wireless telecommunication network may comprise a 5G cellular network, and thus, other restraints, according to the 5G standard may be taken into account when determining the number of symbols per reference clock over which the reference signal may be transmitted.

Means for performing the functionality at block 610 may comprise one or more components of a base station, such as a bus 1005, processing unit(s) 1010, memory 1060, and/or other components of the base station 1000 illustrated in FIG. 10 and described in more detail below.

At block 620, the functionality comprises transmitting, with the base station at the determined one or more symbols, the reference signal on a first portion of the frequency band such that the power of the reference signal occupies a plurality of non-contiguous sub-bands of the allocated frequency band. Here, the plurality of non-contiguous sub-bands of the allocated frequency band have a total bandwidth of less than a bandwidth of the allocated frequency band. For example, the reference signal may be transmitted using a power profile similar to the one illustrated in the example of graph 300-3 of FIG. 3C, having a lower sub-band 330-1 and a upper sub-band 330-2, occupying less bandwidth in total (e.g., 5 MHz) than the total allocated bandwidth e.g., 10 MHz). In such instances, a bandwidth of the lower sub-band may be substantially the same as a bandwidth of the upper sub-band. These sub-bands may be separated by a frequency gap larger than each of the bands. That is, a bandwidth of frequencies of the frequency band between the lower sub-band and upper sub-band may be larger than a bandwidth of either the lower sub-band or the upper sub-band. In some instances, the bandwidth of frequencies of the frequency band between the lower sub-band and upper sub-band may be substantially the same as a combined bandwidth of the lower sub-band and the upper sub-band. (Again, as illustrated in graph 300-3, the lower and upper or sub-bands 330 may be separated by a notch as big as their combined bandwidth, although notch size may vary in alternative embodiments.)

As illustrated in FIG. 5, different reference signals may occupy different sub-bands and/or have a different periodicity. For example, a base station may further transmit a second reference signal on a second portion of the frequency band such that the power of the reference signal occupies one or more sub-bands of the allocated frequency band different than the plurality of non-contiguous sub-bands of the allocated frequency band. Here, the base station that transmits the second reference signal may be the same as or different than the base station that transmits the first reference signal.

As described in the embodiments above, reference signals can be encoded with pre-determined codes for base station isolation. Moreover, codes may be truncated or zero-padded as necessary. According to some embodiments, Zadoff-Chu codes may be used.

Means for performing the functionality at block 620 may comprise one or more components of a base station, such as a bus 1005, processing unit(s) 1010, wireless communication interface 1030, memory 1060, and/or other components of the base station 1000 illustrated in FIG. 10 and described in more detail below.

Figure 7:
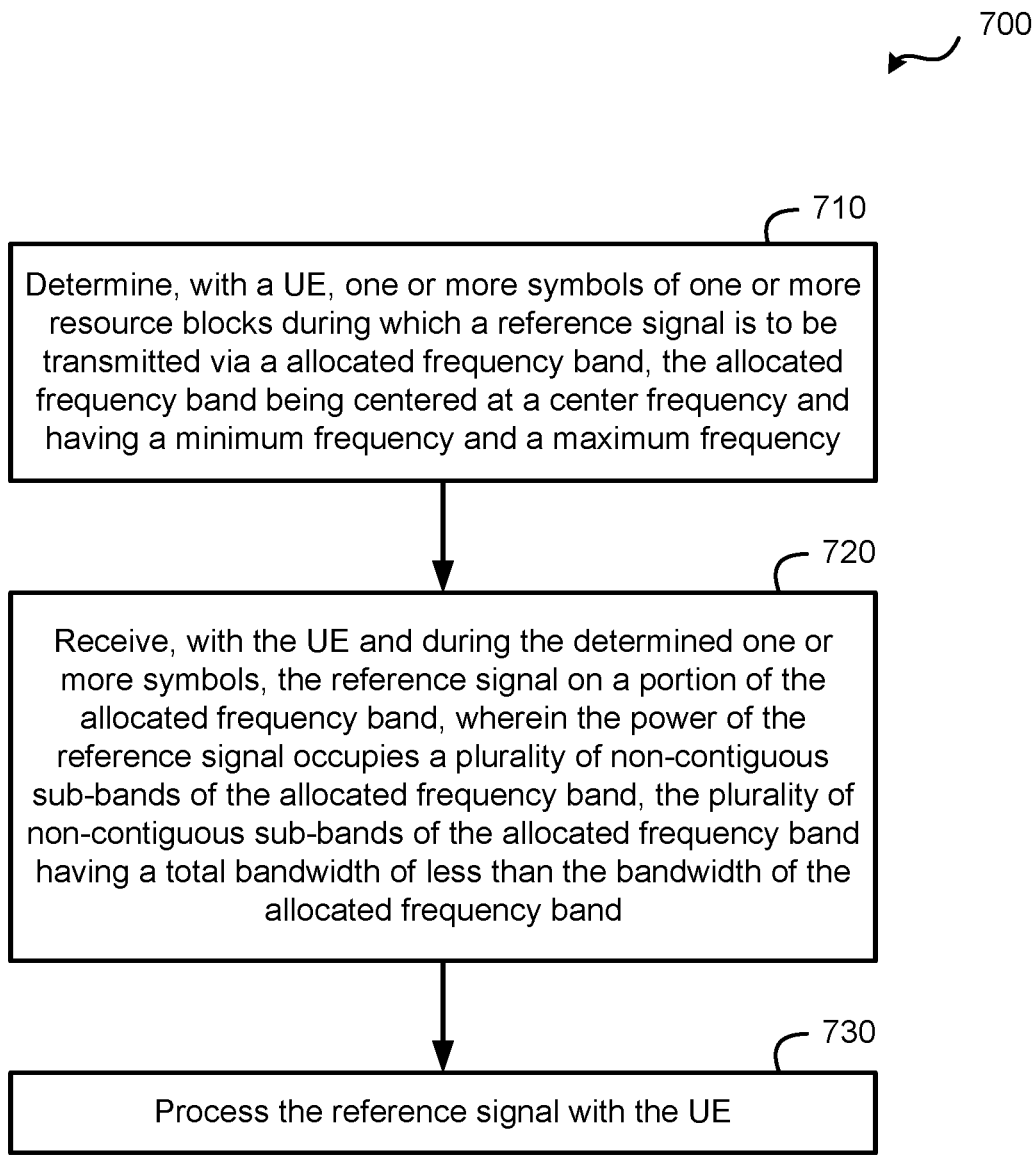
FIG. 7 is a flow diagram illustrating a method of detecting a reference signal received from a base station in a wireless network, according to an embodiment.

FIG. 7 is a flow diagram illustrating a method 700 of detecting a reference signal received from a base station in a wireless network, according to an embodiment, which illustrates the functionality of a UE according to aspects of embodiments described above and illustrated in FIGS. 1 and 3-5. Means for performing the functionality of the blocks may include software and/or hardware components of a UE 105, as illustrated in FIG. 8 and described in more detail below.

At block 710, the functionality includes determining, with a UE, one or more symbols of one or more resource blocks during which a reference signal is to be transmitted on an allocated frequency band, the allocated frequency band being centered at a center frequency and having a minimum frequency and a maximum frequency. Again, this determination may further comprise determining the PRBs an individual resource elements used for the transmission of the reference signal. As noted in the embodiments described above, this determination can be based on information received from a location server. That is, a UE can receive an indication of the allocated frequency band from the location server, and this indication can include an indication of an offset for each sub-band of a plurality of non-contiguous sub-bands of the allocated frequency band used to communicate the reference signal, a bandwidth for each sub-band of the plurality of non-contiguous sub-bands, a periodicity of the reference signal, a duration of the reference signal, or any combination thereof.

Figure 8:
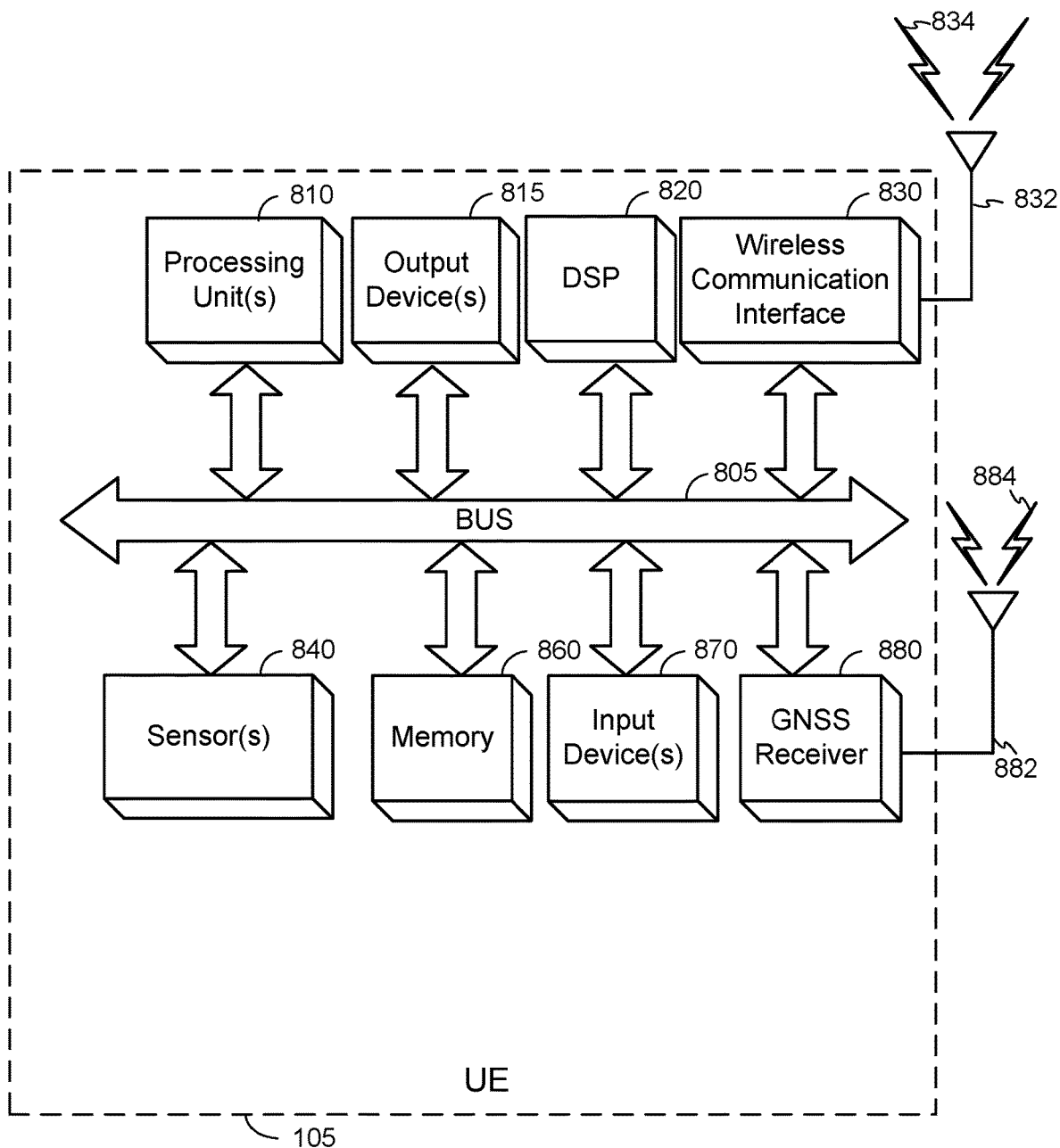
FIG. 8 is an embodiment of a UE.

Means for performing the functions at block 710 may comprise, for example, bus 805, processing unit(s) 810, wireless communication interface 830, memory 860, and/or other hardware and/or software components of a UE 105 as illustrated in FIG. 8 and described in more detail below.

At block 720, the functionality comprises receiving, with the UE and at the determined one or more symbols, the reference signal on a portion of the allocated frequency band, wherein the power of the reference signal occupies a plurality of non-contiguous sub-bands of the allocated frequency band, the plurality of non-contiguous sub-bands of the allocated frequency band having a total bandwidth of less than the bandwidth of the allocated frequency band. As noted in the examples illustrated in FIGS. 3A-3C, the sub-bands used for communicating the reference signal may comprise only a portion of the total allocated frequency band. A UE can use the determination in block 710 to "listen" for the reference signal by determining the resource elements used for transmitting the reference signal.

Means for performing the functions at block 720 may comprise, for example, bus 805, processing unit(s) 810, wireless communication interface 830, memory 860, and/or other hardware and/or software components of a UE 105 as illustrated in FIG. 8 and described in more detail below.

At block 730, the functionality comprises processing the reference signal with the UE. As indicated in the embodiments described above, the reference signal may be encoded with a pre-determined code, such as a Zadoff-Chu code, to help a receiving device determine the base station from which the reference signal is transmitted. Thus, as part of the signal processing, the reference signal may then be cross-correlated with a pre-determined code, which may be truncated and/or zero-padded as needed (and as described herein above) to help ensure the length of the pre-determined code matches and allocated length for such codes. The UE can determine a time at which the reference signal was received based on the processing the reference signal.

Means for performing the functions at block 720 may comprise, for example, bus 805, processing unit(s) 810, memory 860, and/or other hardware and/or software components of a UE 105 as illustrated in FIG. 8 and described in more detail below.

Figure 9:
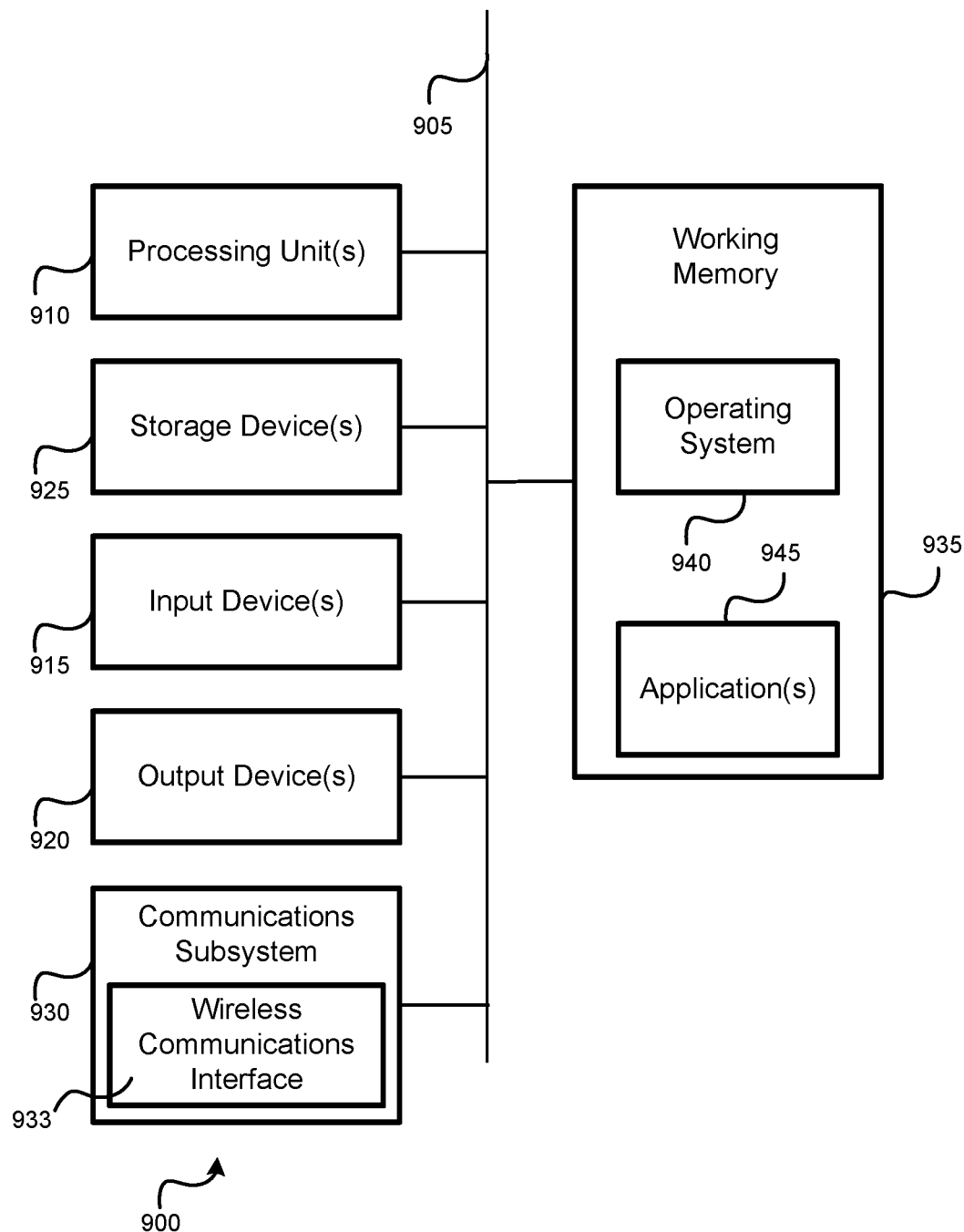
FIG. 9 is an embodiment of a computer system.

Some embodiments may further include a method of reference signal allocation by a location server (or other entity) in a wireless telecommunication network. In such embodiments, the method may comprise determining one or more symbols of one or more resource blocks during which a first reference signal is to be transmitted on an allocated frequency band by a base station, the allocated frequency band being centered at a center frequency and having a minimum frequency and a maximum frequency. The method may further comprise sending, to the base station, an indication of the determined one or more symbols of the one or more resource blocks during which the first reference signal is to be transmitted, and a plurality of non-contiguous sub-bands of the allocated frequency band on which the first reference signal is to be transmitted, the plurality of non-contiguous sub-bands of the allocated frequency band having a total bandwidth of less than the bandwidth of the allocated frequency band. Means for performing on or more of the functions of such a method may comprise, for example, bus 905, processing unit(s) 910, memory 935, communications subsystem 930, and/or other hardware and/or software components of a computer system 900 as illustrated in FIG. 9 and described in more detail below.

FIG. 8 illustrates an embodiment of a UE 105, which can be utilized as described herein above (e.g. in association with FIGS. 1-7). For example, the UE 105 can perform one or more of the functions of method 700 of FIG. 7. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 805 (or may otherwise be in communication, as appropriate). The hardware elements may include a processing unit(s) 810 which can include without limitation one or more general-purpose processors, one or more special-purpose processors (such as Digital Signal Processor (DSP) chips, graphics acceleration processors, Application Specific Integrated Circuits (ASICs), and/or the like), and/or other processing structure or means. As shown in FIG. 8, some embodiments may have a separate DSP 820, depending on desired functionality. Location determination and/or other determinations based on wireless communication may be provided in the processing unit(s) 810 and/or wireless communication interface 830 (discussed below). The UE 105 also can include one or more input devices 870, which can include without limitation a keyboard, touch screen, a touch pad, microphone, button(s), dial(s), switch(es), and/or the like; and one or more output devices 815, which can include without limitation a display, light emitting diode (LED), speakers, and/or the like.

The UE 105 might also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMAX device, cellular communication facilities, etc.), and/or the like, which may enable the UE 105 to communicate via the networks described above with regard to FIG. 1. The wireless communication interface 830 may permit data and signaling to be communicated (e.g. transmitted and received) with a network, eNBs, gNBs, ng-eNBs, and/or other network components, computer systems, and/or any other electronic devices described herein. The communication can be carried out via one or more wireless communication antenna(s) 832 that send and/or receive wireless signals 834.

Depending on desired functionality, the wireless communication interface 830 may comprise separate transceivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as cdma2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 840. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein.

Embodiments of the UE 105 may also include a GNSS receiver 880 capable of receiving signals 884 from one or more GNSS satellites (e.g., SVs 190) using an antenna 882 (which could be the same as antenna 832). Positioning based on GNSS signal measurement can be utilized to complement and/or incorporate the techniques described herein. The GNSS receiver 880 can extract a position of the UE 105, using conventional techniques, from GNSS SVs of a GNSS system, such as Global Positioning System (GPS), Galileo, Glonass, Quasi-Zenith Satellite System (QZSS) over Japan, Indian Regional Navigational Satellite System (IRNSS) over India, Beidou over China, and/or the like. Moreover, the GNSS receiver 880 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

The UE 105 may further include and/or be in communication with a memory 860. The memory 860 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 860 of the UE 105 also can comprise software elements (not shown in FIG. 8), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 860 that are executable by the UE 105 (and/or processing unit(s) 810 or DSP 820 within UE 105). In an aspect, then, such code and/or instructions can be used to configure and/or adapt a general purpose computer (or other device) to perform one or more operations in accordance with the described methods.

FIG. 9 illustrates an embodiment of a computer system 900, which may be utilized and/or incorporated into one or more components of a communication system (e.g., communication system 100 of FIG. 1), including various components of a 5G network, such as the NG-RAN 135 and 5GC 140, and/or similar components of other network types. FIG. 9 provides a schematic illustration of one embodiment of a computer system 900 that can perform the methods provided by various other embodiments, such as the method described in relation to FIG. 8. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner. In addition, it can be noted that components illustrated by FIG. 9 can be localized to a single device and/or distributed among various networked devices, which may be disposed at different physical or geographical locations. In some embodiments, the computer system 900 may correspond to an LMF 120, an E-SMLC, a SUPL SLP and/or some other type of location-capable device.

The computer system 900 is shown comprising hardware elements that can be electrically coupled via a bus 905 (or may otherwise be in communication, as appropriate). The hardware elements may include processing unit(s) 910, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 6. The computer system 900 also can include one or more input devices 915, which can include without limitation a mouse, a keyboard, a camera, a microphone, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a RAM and/or a ROM, which can be programmable, flash-updateable, and/or the like. Such storage devices may be configured to implement any appropriate data stores, including without limitation, various file systems, database structures, and/or the like.

The computer system 900 may also include a communications subsystem 930, which can include support of wireline communication technologies and/or wireless communication technologies (in some embodiments managed and controlled by a wireless communication interface 933. The communications subsystem 930 may include a modem, a network card (wireless or wired), an infrared communication device, a wireless communication device, and/or a chipset, and/or the like. The communications subsystem 930 may include one or more input and/or output communication interfaces, such as the wireless communication interface 933, to permit data and signaling to be exchanged with a network, mobile devices, other computer systems, and/or any other electronic devices described herein.

In many embodiments, the computer system 900 will further comprise a working memory 935, which can include a RAM and/or or ROM device. Software elements, shown as being located within the working memory 935, can include an operating system 940, device drivers, executable libraries, and/or other code, such as application(s) 945, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 8, may be implemented as code and/or instructions that are stored (e.g. temporarily) in working memory 935 and are executable by a computer (and/or a processing unit within a computer such as processing unit(s) 910); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

FIG. 10 illustrates an embodiment of a base station 1000, which can be utilized as described herein above (e.g., in association with FIGS. 1-7). For example, the base station 1000 can perform one or more of the functions of method 600 of FIG. 6. It should be noted that FIG. 10 is meant only to provide a generalized illustration of various components, any or all of which may be utilized as appropriate. In some embodiments, the base station 1000 may correspond to a gNB 110, an ng-eNB 114, and/or an eNB as described herein above.

The base station 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as DSP chips, graphics acceleration processors, ASICs, and/or the like), and/or other processing structure or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below), according to some embodiments. The base station 1000 also can include one or more input devices 1070, which can include without limitation a keyboard, display, mouse, microphone, button(s), dial(s), switch(es), and/or the like; and one or more output devices 1015, which can include without limitation a display, light emitting diode (LED), speakers, and/or the like.

The base station 1000 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMAX device, cellular communication facilities, etc.), and/or the like, which may enable the base station 1000 to communicate as described herein. The wireless communication interface 1030 may permit data and signaling to be communicated (e.g. transmitted and received) UEs, other base stations (e.g., eNBs, gNBs, and ng-eNBs), and/or other network components, computer systems, and/or any other electronic devices described herein. The communication can be carried out via one or more wireless communication antenna(s) 1032 that send and/or receive wireless signals 1034.

The base station 1000 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein.

In many embodiments, the base station 1000 will further comprise a memory 1060. The memory 760 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1060 of the base station 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the base station 1000 (and/or processing unit(s) 1010 or DSP 1020 within base station 1000). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

A person of ordinary skill in the art will recognize that an example non-transitory computer-readable medium, according to this description, can include instructions embedded thereon for providing reference signals with a base station in a wireless telecommunication network. The instructions can comprise computer code for determining one or more symbols of one or more resource blocks during which a first reference signal is to be transmitted on an allocated frequency band, the allocated frequency band being centered at a center frequency and having a minimum frequency and a maximum frequency. The instructions can further comprise computer code for transmitting, with the base station and during the determined one or more symbols, the first reference signal on a first portion of the allocated frequency band such that a power of the first reference signal occupies a plurality of non-contiguous sub-bands of the allocated frequency band, the plurality of non-contiguous sub-bands of the allocated frequency band having a total bandwidth of less than a bandwidth of the allocated frequency band.

A person of ordinary skill in the art will also recognize that an example non-transitory computer-readable medium, according to this description, can include instructions embedded thereon for detecting a reference signal received from a base station in a wireless telecommunication network. The instructions can comprise computer code for determining, with a user equipment (UE), one or more symbols of one or more resource blocks during which the reference signal is to be transmitted via an allocated frequency band, the allocated frequency band being centered at a center frequency and having a minimum frequency and a maximum frequency. The instructions can further comprise computer code for receiving, with the UE and during the determined one or more symbols, the reference signal on a portion of the allocated frequency band, wherein a power of the reference signal occupies a plurality of non-contiguous sub-bands of the allocated frequency band, the plurality of non-contiguous sub-bands of the allocated frequency band having a total bandwidth of less than the bandwidth of the allocated frequency band. The instructions can also comprise computer code for processing the reference signal with the UE.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of providing reference signals with a base station in a wireless telecommunication network, the method comprising:
   receiving an indication of a frequency offset for each sub-band of a plurality of non-contiguous sub-bands of an allocated frequency band;
   determining, based at least in part on the indication of the frequency offset for each sub-band of the plurality of non-contiguous sub-bands, one or more symbols of one or more resource blocks during which a first reference signal is to be transmitted on the allocated frequency band, the allocated frequency band being centered at a center frequency and having a minimum frequency and a maximum frequency; and
   transmitting, with the base station and during the determined one or more symbols, the first reference signal on a first portion of the allocated frequency band such that a power of the first reference signal occupies the plurality of non-contiguous sub-bands of the allocated frequency band, the plurality of non-contiguous sub-bands of the allocated frequency band having a total bandwidth of less than a bandwidth of the allocated frequency band.

2. The method of claim 1, wherein the wireless telecommunication network comprises a fifth-generation (5G) cellular network.

3. The method of claim 1, wherein the plurality of non-contiguous sub-bands comprise a lower sub-band and an upper sub-band having a bandwidth within the allocated frequency band, between the lower sub-band and upper sub-band, and a bandwidth of the lower sub-band is substantially the same as a bandwidth of the upper sub-band.

4. The method of claim 3, wherein the bandwidth within the allocated frequency band, between the lower sub-band and the upper sub-band, is larger than a bandwidth of either the lower sub-band or the upper sub-band.

5. The method of claim 4, wherein the bandwidth within the allocated frequency band, between the lower sub-band and the upper sub-band, is substantially the same as a combined bandwidth of the lower sub-band and the upper sub-band.

6. The method of claim 1, further comprising transmitting a second reference signal on a second portion of the allocated frequency band such that the power of the second reference signal occupies one or more sub-bands of the allocated frequency band different than the plurality of non-contiguous sub-bands of the allocated frequency band.

7. The method of claim 6, further comprising transmitting the first reference signal on the first portion of the allocated frequency band with a first periodicity and transmitting the second reference signal on the second portion of the allocated frequency band with a second periodicity different than the first periodicity.

8. The method of claim 1, wherein transmitting the first reference signal comprises encoding the reference signal with a Zadoff-Chu code.

9. The method of claim 1, wherein the indication of the frequency offset for each sub-band of the plurality of non-contiguous sub-bands is received from a location server.

10. The method of claim 9, further comprising receiving an indication of: p1 a bandwidth for each sub-band of the plurality of non-contiguous sub-bands, p1 a periodicity of the first reference signal, p1 a duration of the first reference signal, or p1 any combination thereof.

11. A base station comprising:
a wireless communication interface;
a memory; and
a processing unit communicatively coupled with the wireless communication interface and the memory and configured to:
receive an indication of a frequency offset for each sub-band of a plurality of non-contiguous sub-bands of an allocated frequency band;
determine, based at least in part on the indication of the frequency offset for each sub-band of the plurality of non-contiguous sub-bands, one or more symbols of one or more resource blocks during which a first reference signal is to be transmitted on the allocated frequency band, the allocated frequency band being centered at a center frequency and having a minimum frequency and a maximum frequency; and
transmit, with the wireless communication interface and during the determined one or more symbols, the first reference signal on a first portion of the allocated frequency band such that a power of the first reference signal occupies the plurality of non-contiguous sub-bands of the allocated frequency band, the plurality of non-contiguous sub-bands of the allocated frequency band having a total bandwidth of less than a bandwidth of the allocated frequency band.

12. The base station of claim 11, wherein the base station is configured to be incorporated into a wireless telecommunication network comprising a fifth-generation (5G) cellular network.

13. The base station of claim 11, wherein the plurality of non-contiguous sub-bands comprise a lower sub-band and an upper sub-band having a bandwidth within the allocated frequency band, between the lower sub-band and upper sub-band, and a bandwidth of the lower sub-band is substantially the same as a bandwidth of the upper sub-band.

14. The base station of claim 13, wherein the bandwidth within the allocated frequency band, between the lower sub-band and the upper sub-band, is larger than a bandwidth of either the lower sub-band or the upper sub-band.

15. The base station of claim 14, wherein the bandwidth within the allocated frequency band, between the lower sub-band and the upper sub-band, is substantially the same as a combined bandwidth of the lower sub-band and the upper sub-band.

16. The base station of claim 11, wherein the processing unit is further configured to transmit a second reference signal on a second portion of the allocated frequency band such that the power of the second reference signal occupies one or more sub-bands of the allocated frequency band different than the plurality of non-contiguous sub-bands of the allocated frequency band.

17. The base station of claim 16, wherein the processing unit is further configured to transmit the first reference signal on the first portion of the allocated frequency band with a first periodicity and transmitting the second reference signal on the second portion of the allocated frequency band with a second periodicity different than the first periodicity.

18. The base station of claim 11, wherein the processing unit is configured to transmit the first reference signal at least in part by encoding the first reference signal with a Zadoff-Chu code.

19. The base station of claim 11, wherein the processing unit is configured to receive the indication of the frequency offset for each sub-band of the plurality of non-contiguous sub-bands is received from a location server.

20. The base station of claim 19, wherein the processing unit is further configured to receive the indication of: p1 a bandwidth for each sub-band of the plurality of non-contiguous sub-bands, p1 a periodicity of the first reference signal, p1 a duration of the first reference signal, or p1 any combination thereof.

21. A device comprising:
means for receiving an indication of a frequency offset for each sub-band of a plurality of non-contiguous sub-bands of an allocated frequency band;
means for determining, based at least in part on the indication of the frequency offset for each sub-band of the plurality of non-contiguous sub-bands, one or more symbols of one or more resource blocks during which a first reference signal is to be transmitted on the allocated frequency band, the allocated frequency band being centered at a center frequency and having a minimum frequency and a maximum frequency; and
means for transmitting, during the determined one or more symbols, the first reference signal on a first portion of the allocated frequency band such that a power of the first reference signal occupies the plurality of non-contiguous sub-bands of the allocated frequency band, the plurality of non-contiguous sub-bands of the allocated frequency band having a total bandwidth of less than a bandwidth of the allocated frequency band.

22. The device of claim 21, further comprising means for transmitting a second reference signal on a second portion of the allocated frequency band such that the power of the second reference signal occupies one or more sub-bands of the allocated frequency band different than the plurality of non-contiguous sub-bands of the allocated frequency band.

23. The device of claim 22, further comprising means for transmitting the first reference signal on the first portion of the allocated frequency band with a first periodicity and transmitting the second reference signal on the second portion of the allocated frequency band with a second periodicity different than the first periodicity.

24. The device of claim 21, wherein the means for transmitting the first reference signal comprise means for encoding the reference signal with a Zadoff-Chu code.

25. A method of detecting a reference signal received from a base station in a wireless telecommunication network, the method comprising:
receiving an indication of a frequency offset for each sub-band of a plurality of non-contiguous sub-bands of an allocated frequency band;
determining, with a user equipment (UE) and based at least in part on the indication of the frequency offset for each sub-band of the plurality of non-contiguous sub-bands, one or more symbols of one or more resource blocks during which the reference signal is to be transmitted via the allocated frequency band, the allocated frequency band being centered at a center frequency and having a minimum frequency and a maximum frequency;
receiving, with the UE and during the determined one or more symbols, the reference signal on a portion of the allocated frequency band, wherein a power of the reference signal occupies the plurality of non-contiguous sub-bands of the allocated frequency band, the plurality of non-contiguous sub-bands of the allocated frequency band having a total bandwidth of less than the bandwidth of the allocated frequency band; and
processing the reference signal with the UE.

26. The method of claim 25, wherein processing the reference signal comprises performing a cross-correlation of the signal with a pre-determined code.

27. The method of claim 25, further comprising determining a time at which the reference signal was received by the UE based on the processing of the reference signal.

28. The method of claim 25, wherein the indication of the frequency offset for each sub-band of the plurality of non-contiguous sub-bands is received from a location server.

29. The method of claim 28, further comprising receiving an indication of:
a bandwidth for each sub-band of the plurality of non-contiguous sub-bands,
a periodicity of the reference signal,
a duration of the reference signal, or
any combination thereof.

30. A user equipment (UE) comprising:
a wireless communication interface;
a memory; and
a processing unit communicatively coupled with the wireless communication interface and the memory and configured to:
receive an indication of a frequency offset for each sub-band of a plurality of non-contiguous sub-bands of an allocated frequency band;
determine, based at least in part on the indication of the frequency offset for each sub-band of the plurality of non-contiguous sub-bands, one or more symbols of one or more resource blocks during which a reference signal is to be transmitted by a base station in a wireless telecommunication network, via the allocated frequency band, the allocated frequency band being centered at a center frequency and having a minimum frequency and a maximum frequency;
receive, during the determined one or more symbols, the reference signal on a portion of the allocated frequency band, wherein a power of the reference signal occupies the plurality of non-contiguous sub-bands of the allocated frequency band, the plurality of non-contiguous sub-bands of the allocated frequency band having a total bandwidth of less than the bandwidth of the allocated frequency band; and
process the reference signal.

31. The UE of claim 30, wherein the processing unit is configured to process the reference signal at least in part by performing a cross-correlation of the signal with a pre-determined code.

32. The UE of claim 30, wherein the processing unit is configured to determine a time at which the reference signal was received by the UE based on the processing of the reference signal.

33. The UE of claim 30, wherein the processing unit is further configured to receive the indication of the frequency offset for each sub-band of the plurality of non-contiguous sub-bands is received from a location server.

34. The UE of claim 33, wherein the processing unit is further configured to receive the indication of:
a bandwidth for each sub-band of the plurality of non-contiguous sub-bands,
a periodicity of the reference signal,
a duration of the reference signal, or
any combination thereof.

35. A device comprising:
means for receiving an indication of a frequency offset for each sub-band of a plurality of non-contiguous sub-bands of an allocated frequency band;
means for determining, based at least in part on the indication of the frequency offset for each sub-band of the plurality of non-contiguous sub-bands, one or more symbols of one or more resource blocks during which a reference signal is to be transmitted by a base station in a wireless telecommunication network, via the allocated frequency band, the allocated frequency band being centered at a center frequency and having a minimum frequency and a maximum frequency;
means for receiving, during the determined one or more symbols, the reference signal on a portion of the allocated frequency band, wherein a power of the reference signal occupies the plurality of non-contiguous sub-bands of the allocated frequency band, the plurality of non-contiguous sub-bands of the allocated frequency band having a total bandwidth of less than the bandwidth of the allocated frequency band; and
means for processing the reference signal.

36. The device of claim 35, wherein the means for processing the reference signal comprise means for performing a cross-correlation of the signal with a pre-determined code.

37. The device of claim 35, further comprising means for determining a time at which the reference signal was received by the device based on the processing of the reference signal.

38. The device of claim 35, further comprising means for determining the one or more symbols of the one or more resource blocks during which the reference signal is to be transmitted further comprises receiving an indication of the allocated frequency band from a location server.

* * * * *